No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 3.

WITNESSES:

INVENTOR
Hermann Winter
BY
ATTORNEY

No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 4.
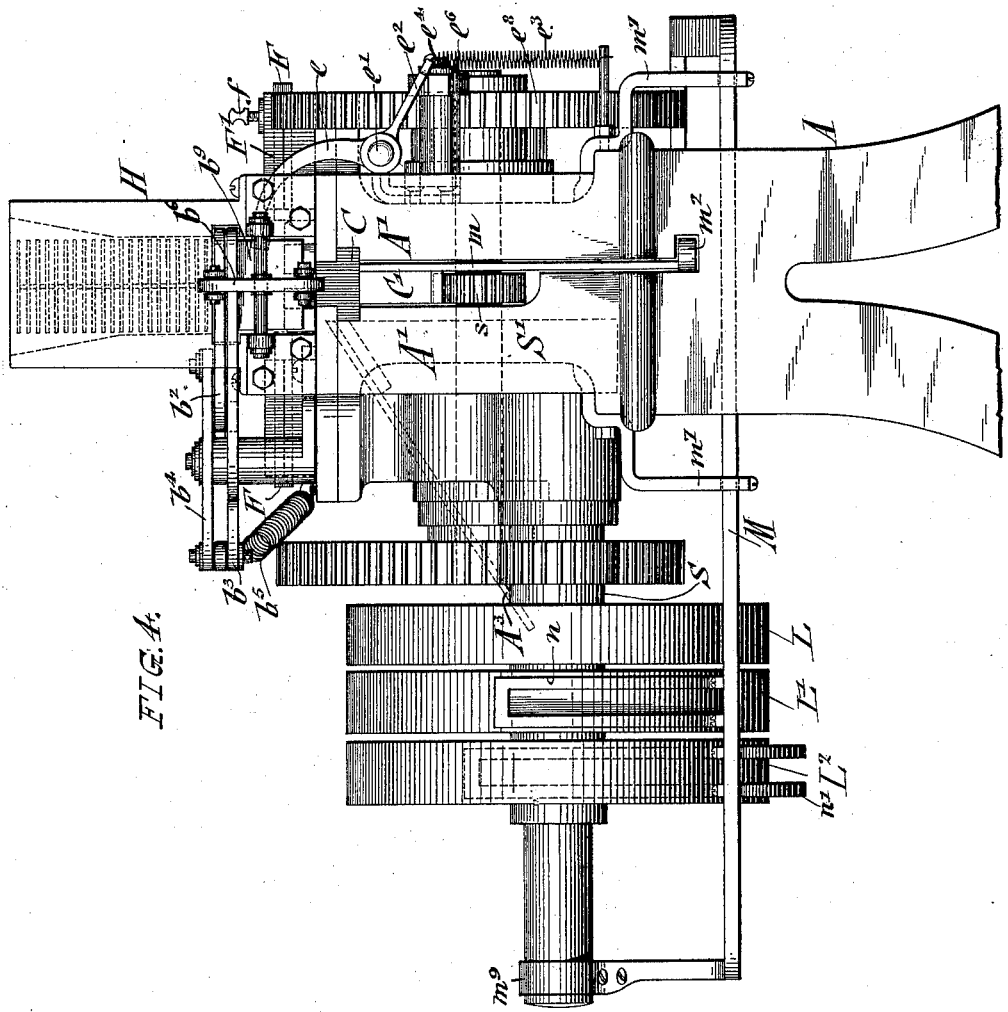
WITNESSES:
INVENTOR
Hermann Winter
BY
ATTORNEYS No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 5.
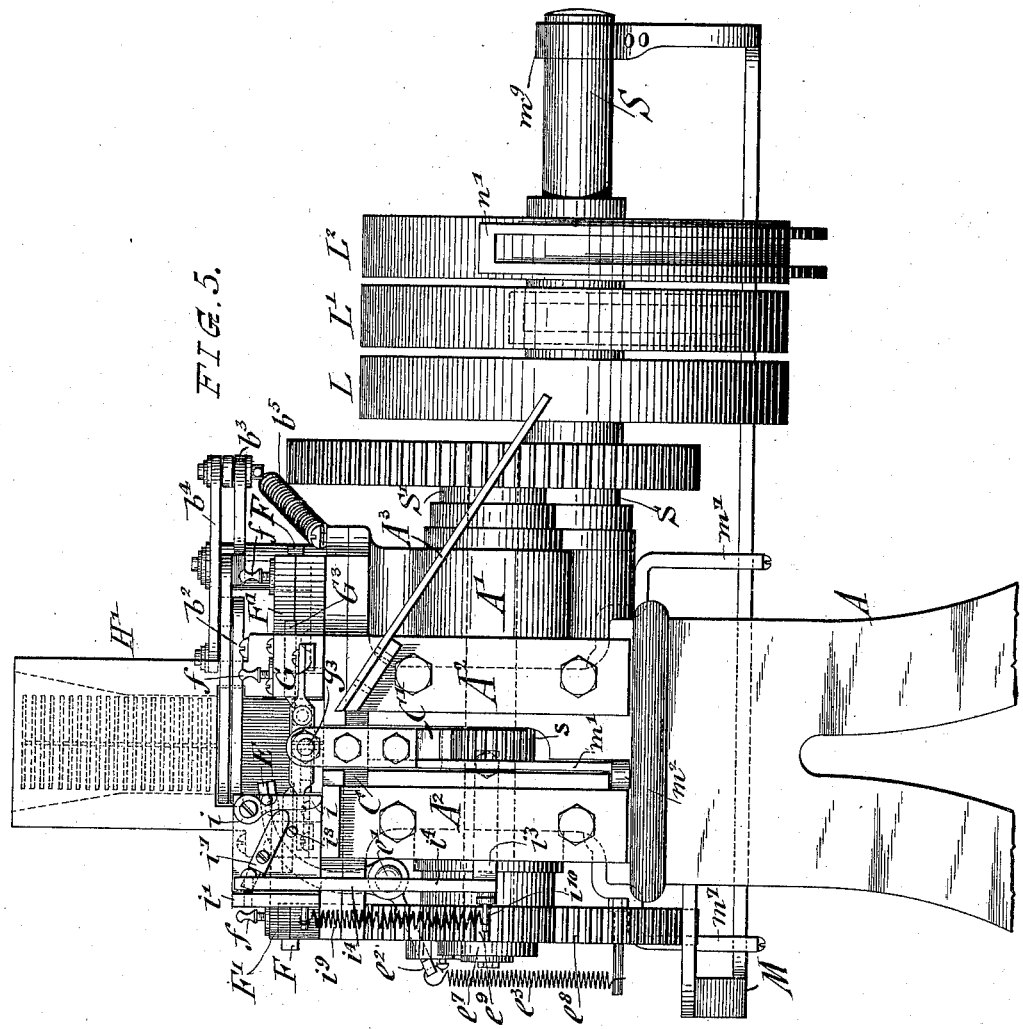
WITNESSES:
INVENTOR
Hermann Winter
BY
ATTORNEYS

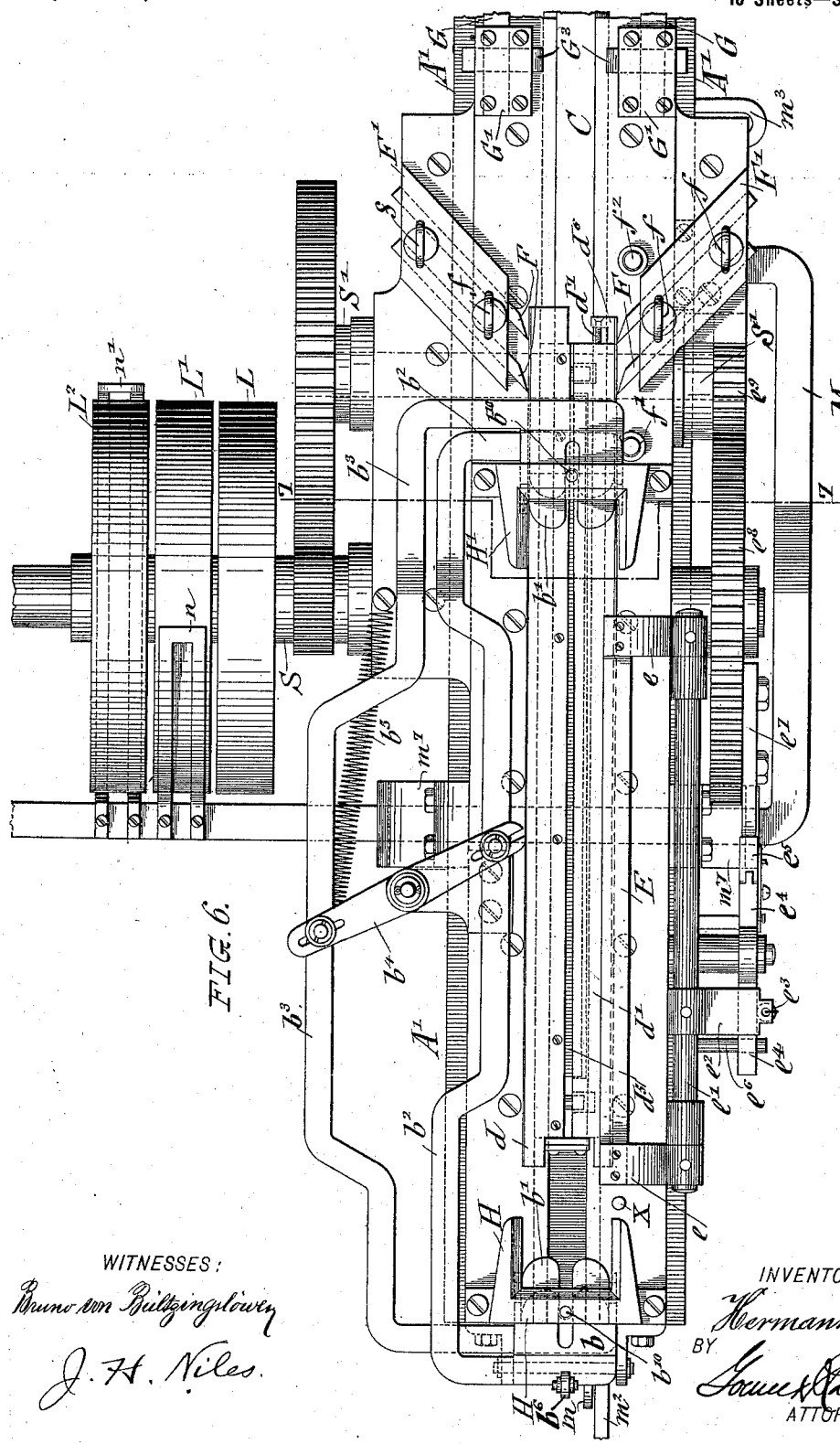

No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 7.
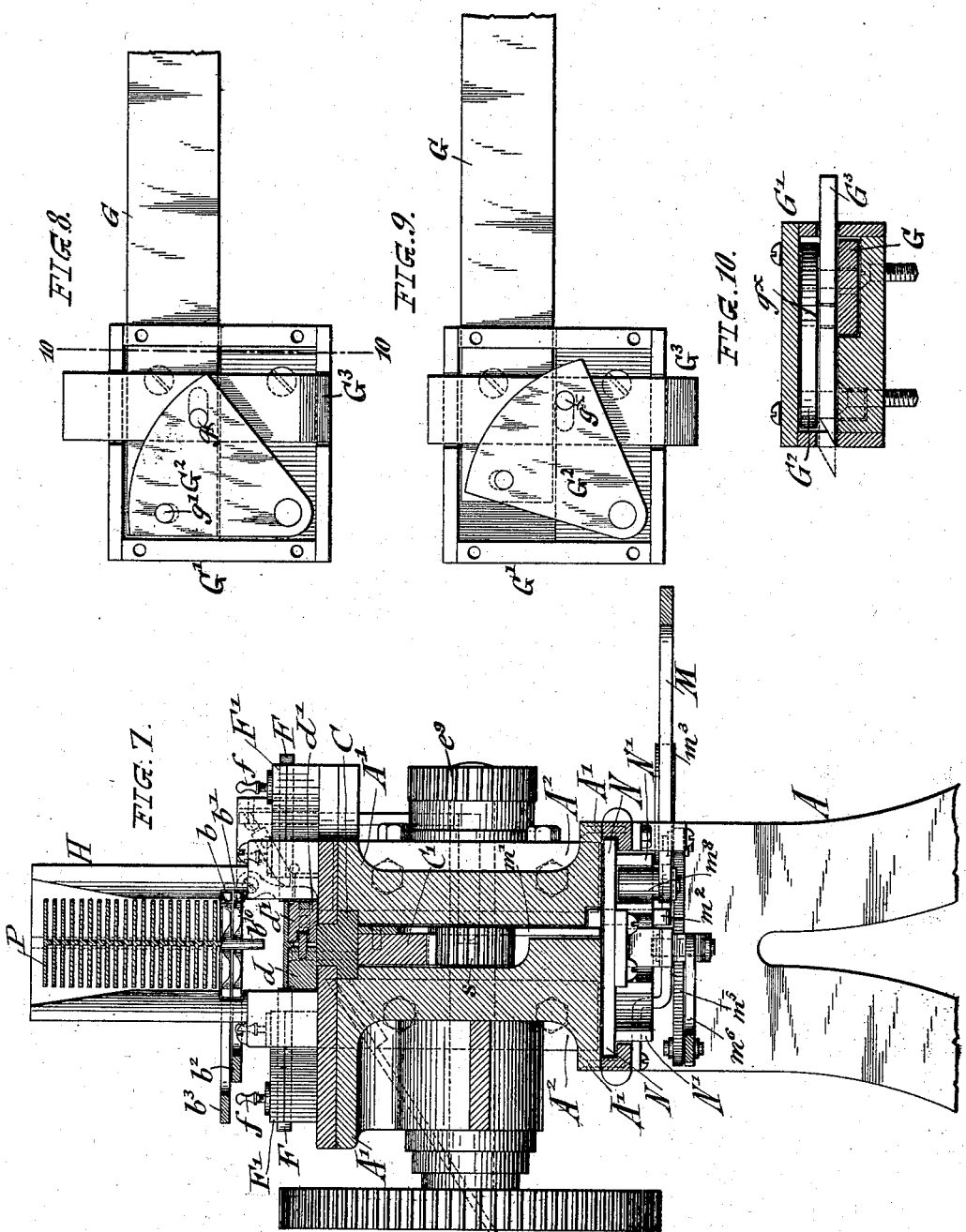
WITNESSES:
Bruno von Bültzingslöwen
J. H. Niles.
INVENTOR
Hermann Winter
BY
Gomez Raymer
ATTORNEY
THE NORRIS PETERS CO., PHOTO-LITHO., WASHINGTON, D. C.

No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 8.
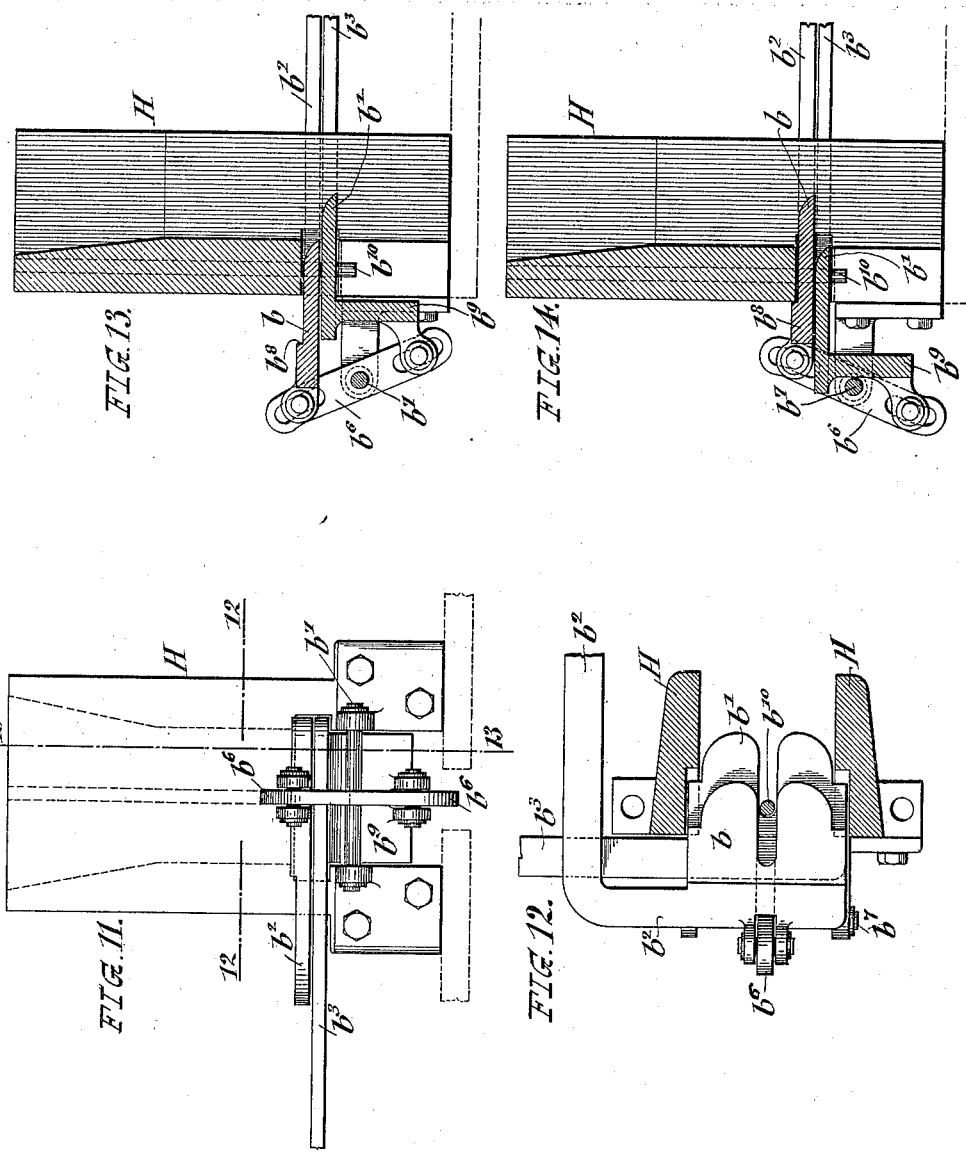

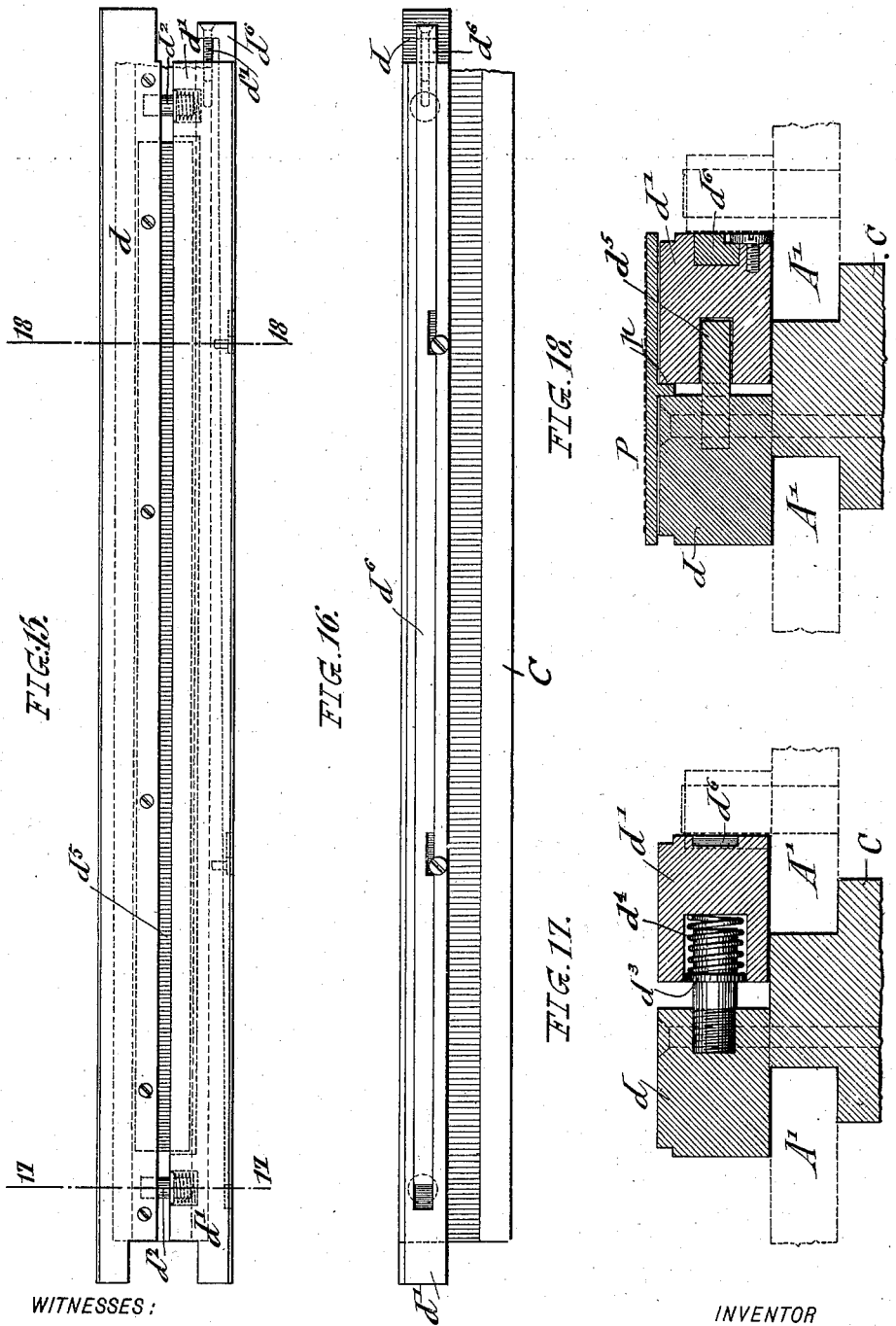

No. 653,050. Patented July 3, 1900.
H. WINTER.
MACHINE FOR TRIMMING STEREOTYPE PLATES.
(Application filed Dec. 15, 1899.)
(No Model.) 10 Sheets—Sheet 10.
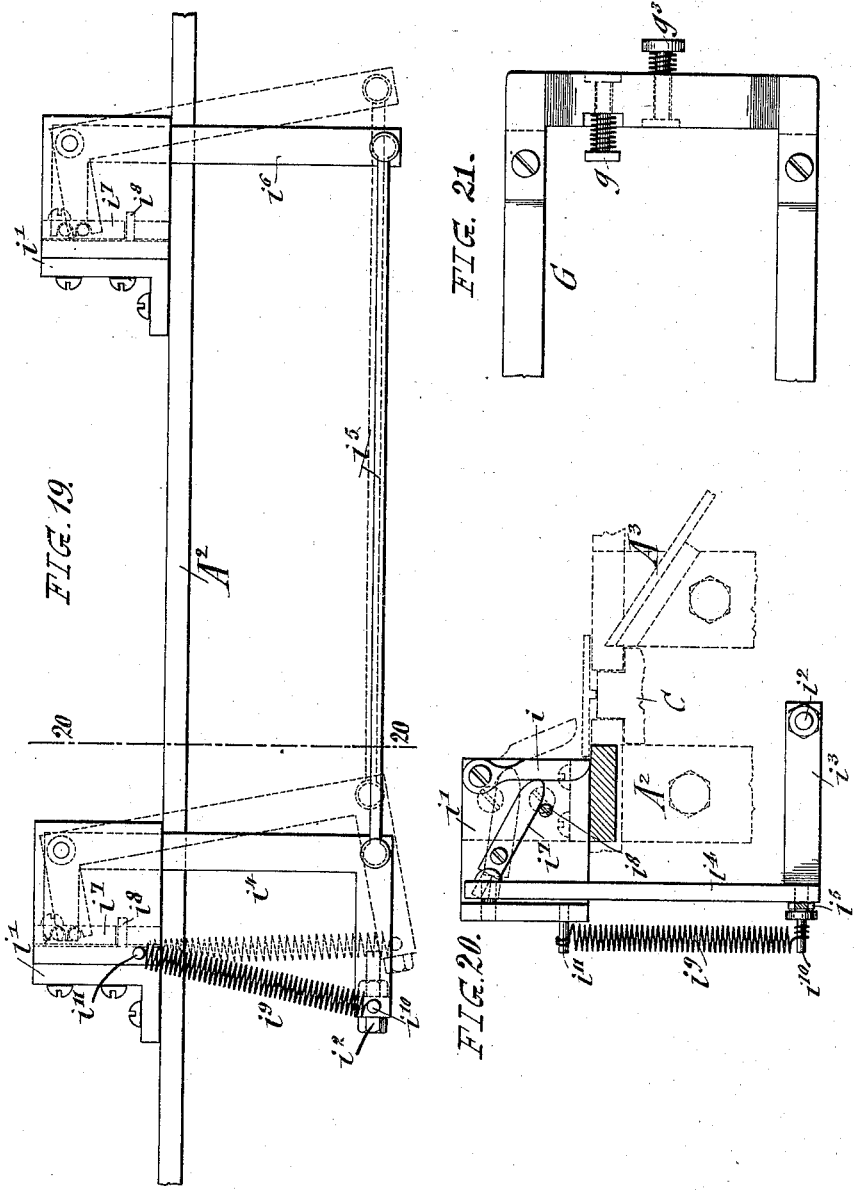

UNITED STATES PATENT OFFICE.

HERMANN WINTER, OF NEW YORK, N. Y., ASSIGNOR TO THE F. WESEL MANUFACTURING COMPANY, OF SAME PLACE.

MACHINE FOR TRIMMING STEREOTYPE-PLATES.

SPECIFICATION forming part of Letters Patent No. 653,050, dated July 3, 1900.

Application filed December 15, 1899. Serial No. 740,422. (No model.)

*To all whom it may concern:*

Be it known that I, HERMANN WINTER, a citizen of the United States, residing in New York, borough of Brooklyn, and State of New York, have invented certain new and useful Improvements in Machines for Trimming Stereotype-Plates, of which the following is a specification.

This invention relates to machines for trimming stereotype-plates; and the object of the invention is to provide a machine for trimming such plates rapidly and automatically, the only hand labor necessary being that involved in supplying the untrimmed plates to the machine and removing the trimmed plates as they are delivered therefrom; and the invention consists in the construction and arrangement of operative parts, as more fully described hereinafter and finally pointed out in the claims.

Figure 1:
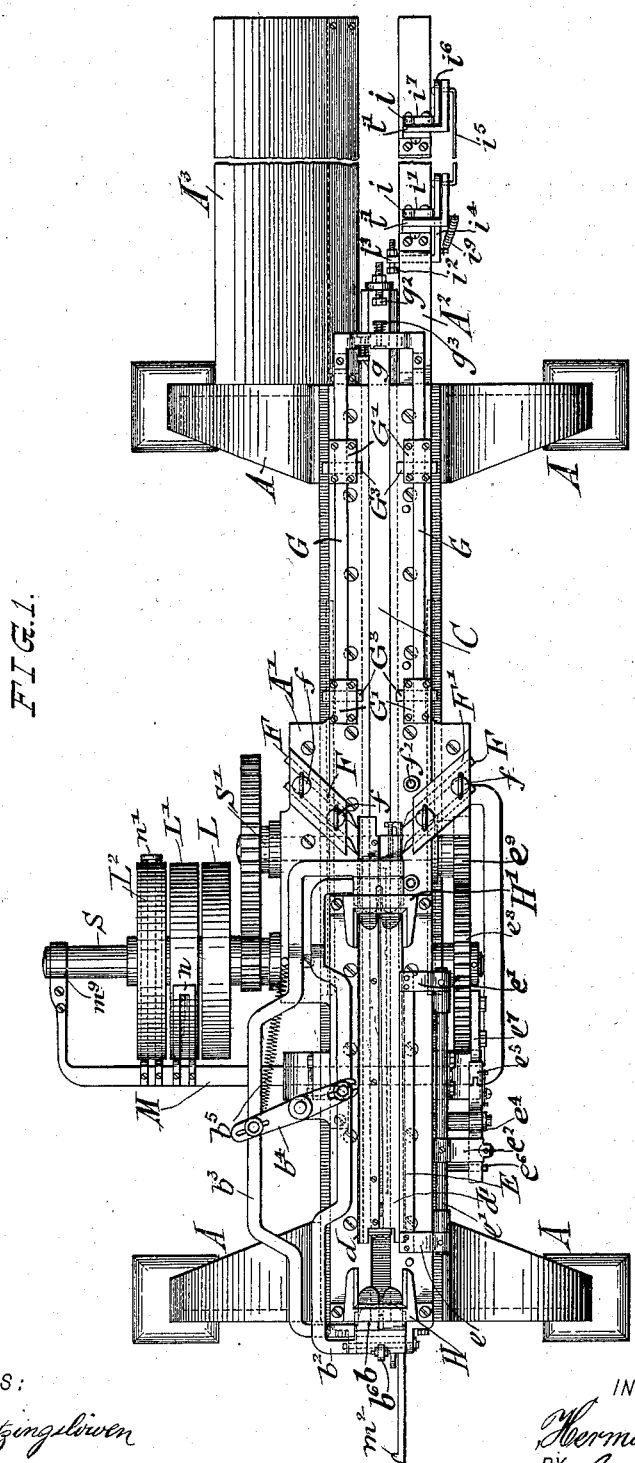
Figure 2:
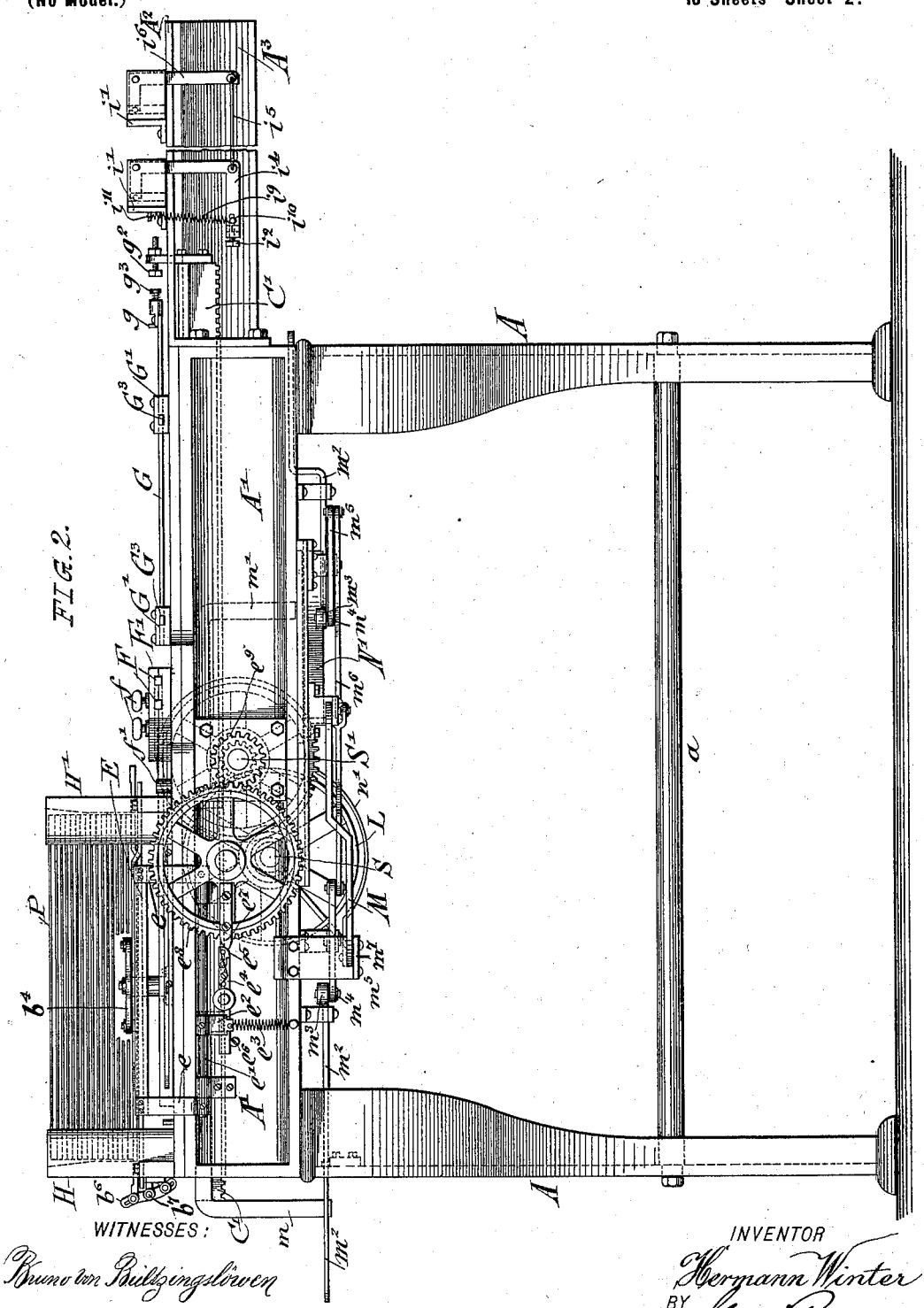
Figure 3:
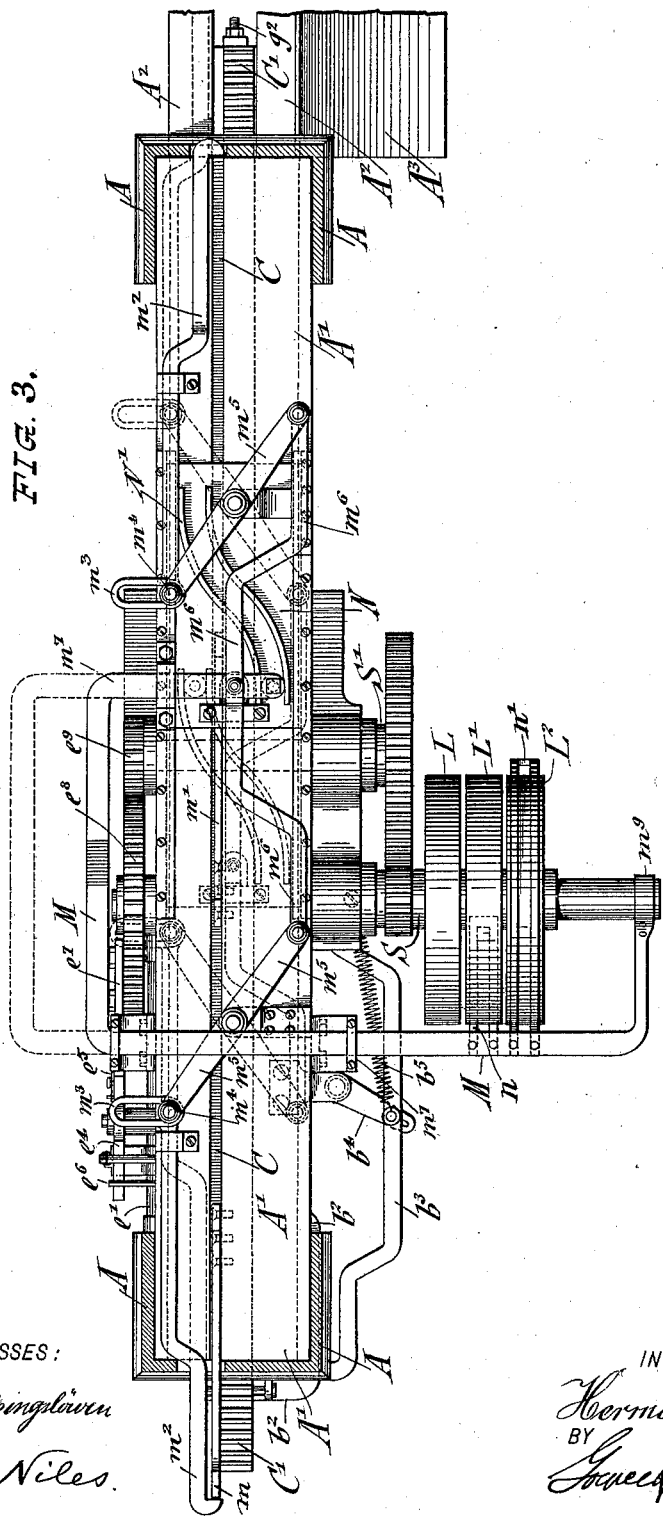

In the accompanying drawings, Figure 1 represents a plan view of a machine for trimming stereotype-plates embodying my improvements. Fig. 2 is a side elevation of the machine. Fig. 3 is a bottom view, partly in horizontal section, through the supporting-standards of the machine. Figs. 4 and 5 are elevations taken, respectively, from the ingoing and outgoing ends of the machine and drawn on a larger scale than Figs. 1, 2, and 3. Fig. 6 is a plan view of the ingoing end of the machine. Fig. 7 is a vertical transverse section on line 7 7, Fig. 6. Figs. 8 and 9 are respectively two top views of the bolts for removing the trimmed plate and their operating mechanism. Fig. 10 is a vertical transverse section on line 10 10, Fig. 8. Figs. 11, 12, 13, and 14 are respectively a detail end view, a plan view, partly in section, on line 12 12, Fig. 11, and vertical transverse sections on line 13 13, Fig. 11, of the mechanism for feeding one plate after the other from the supply-box. Figs. 15, 16, 17, and 18 are respectively a plan view, a side view, and vertical transverse sections on lines 17 17 and 18 18, Fig. 15, of details of the carriage for taking up and moving the stereotype-plates fed to the same. Figs. 19 and 20 represent a side elevation and a vertical transverse section on line 20 20, Fig. 19, of the mechanism for delivering the trimmed stereotype-plates from the machine; and Fig. 21 is a detail plan view of a portion of the mechanism for operating the supporting-bolts shown in Figs. 8 and 9.

Similar letters of reference indicate corresponding parts.

Referring to the drawings, A A are the supporting-standards of my improved machine for trimming stereotype-plates. These standards are connected at their lower part by a longitudinal brace-rod $a$ and at their upper part by a connecting frame or bed A'. To the outgoing end of the frame A' are attached bracket-shaped extensions $A^2$ $A^4$, the latter serving to support an inclined stationary delivery-plate $A^3$.

*The feeding mechanism.*—At the ingoing end of the bed A' is arranged a feed-box in which the stereotype-plates to be trimmed are placed, said feed-box or hopper being formed of U-shaped upright guide-standards H H', which are attached to the top of the bed A' and which are made of such width and located at such distance from each other as may be required to accommodate the stereotype-plates to be trimmed. The inner faces of the U-shaped standards are preferably made tapering, as shown in the drawings. The stereotype-plates P rest on upper and lower sets of reciprocating feeding-fingers $b'$ $b'$, with which each standard is provided, said fingers being guided one set below the other in recesses of said standards, as shown in Figs. 11 to 14. Connecting-rods $b^2$ $b^3$ connect, respectively, each set $b$ $b'$ of the standard H with the opposite set $b'$ $b$ of the standard H'. The middle portions of both connecting-rods $b^2$ $b^3$ are bent or cranked and the rods connected at said bent portions by a centrally-fulcrumed bar $b^4$, the ends of which are slotted and engage pins of the rods $b^2$ $b^3$, the outer connecting-rod $b^3$ being acted upon by a helical spring $b^5$, the ends of which are attached to it and to a stationary point on the bed-frame A', as shown in Figs. 1 and 6. The outer ends of the sets of fingers located at the ingoing end of the machine are connected by a lever $b^6$, which is pivoted to a stationary fulcrum $b^7$ and engages by its slotted ends pins with which the fingers are provided. The upper sets of fingers are provided with shoulders $b^8$, that abut against the upright standard in which they are guided, while the lower set of fingers of the standard H is provided with a shank $b^9$, located at right angles to the fingers, which abut against the lower end of said standard. Both sets of fingers are centrally recessed, so as to provide the required space for a stop-pin $b^{10}$, that extends through each standard to a point below the fingers, said stop-pins serving for the purpose of arresting either set of fingers as it is moved forward in the guide-standards, as shown in Figs. 13 and 14. The central recess or slot is also necessary to permit the fingers to pass under the plates, the rib of a plate entering said recess when the fingers pass under the body of the plate. The spring $b^5$ causes the lowermost sets $b'$ of fingers to normally project into the standards H H', so that the lowermost of a number of plates P in the feed-box rests on said fingers, and the entire number is thus supported.

*The carriage and gripping mechanism.*— The connecting frame or bed A' of the machine is provided with a longitudinal groove or slot extending its full length, and in said groove is guided on suitable shoulders of the same, as shown in Fig. 7, a carriage C, which is provided at one end with longitudinal gripper-bars raised above the level of the other end of the carriage and adapted to move beneath the feed-box described for receiving a plate to be trimmed. The gripper-bars are shown in detail in Figs. 15 to 18, inclusive. The gripper-bar $d$ is stationary relatively to the carriage and is preferably made integral with the same, though it may consist of a separate bar screwed or otherwise firmly secured to the carriage. Parallel with said stationary gripper-bar $d$ is arranged a movable gripper-bar $d'$. At their ends the longitudinal gripper-bars $d$ $d'$ are connected by transverse pins $d^2$, that are screwed into one gripper-bar and that extend into recesses of the other bar, each pin or screw-stud $d^2$ being provided with a shoulder $d^3$, between which and the bottom of the recess of the gripper-bar a helical spring $d^4$ is interposed, which extends around the head of the stud in the socket-recess of the gripper-bar. Said springs thereby serve to keep the grippers normally separated from each other, as shown in Fig. 17, and at the same time permit the lateral movement of the movable gripper-bar, and thereby the narrowing of the space between the gripper-bars, as shown in Fig. 18. In order to secure the reliable guiding of the gripper in its lateral movement and also to prevent longitudinal movement of the grippers relatively to each other, one of the gripper-bars is provided at its side with a longitudinal rib $d^5$, which enters a corresponding recess of the other bar, as shown in Fig. 18. The movable gripper-bar is provided at its outer side with a tapering longitudinal strip $d^6$, which is retained in any suitable manner in a tapering recess of the bar and provided with a suitable set-screw $d^7$ and which serves for regulating the closure of the space between the bars and for taking up wear on the same. At its under side the carriage C is provided with a rack-bar C', which meshes with a pinion $s$ on the auxiliary driving-shaft S', which is geared to the driving-shaft S, which latter is journaled in the bed-frame of the machine and provided at its outer end with two loose pulleys L L² and an intermediate tight pulley L'.

*The straightener.*—When the plate is dropped from the fingers $b'$ onto the carriage, the rib $p$ of the plate P enters the space between the gripper-bars, and the plate itself rests upon the bars. In order to quickly settle the plate and to straighten the same on the gripper-bars, a straightener is employed, which consists of a straightening-bar E, which is applied to the ends of two arms $e$, which are keyed to the ends of an oscillating shaft $e'$, as shown in Fig. 2. The straightening-bar is faced with felt or other soft material, so that the stereotype-plate is not injured by contact with the bar. From the shaft $e'$ extends in downward direction an arm $e^2$, which is connected by a helical spring $e^3$ with a pin on the supporting-frame of the machine, said arm being intermittently engaged by a fulcrumed lever $e^4$, which is provided with a pivoted and spring-actuated tip $e^5$, and arrested by means of a stop-pin $e^6$ at the opposite end, so as to be held in horizontal position and ready to be engaged by a projecting finger $e^7$, which is attached to a gear-wheel $e^8$, to which rotary motion is imparted by a pinion $e^9$ of the intermediate driving-shaft S'. The intermediate shaft S' receives motion from the main driving-shaft S by means of a pinion and gear wheel transmission. During the return motion the straightening-bar is not operated, but only during the forward motion of the carriage at the moment when the stereotype-plate has been dropped on the gripper-bars is it tripped by the tripping mechanism shown.

*The trimming-knives and gripper-closing rollers.*—As soon as the stereotype-plate is straightened the forward motion of the carriage commences. During the forward motion of the gripper-bars the stereotype-plate is firmly held between the longitudinal gripper-bars of the carriage, so as to be subjected to the trimming action of inclined cutting-knives F, that are supported by suitable keepers F' on the top of the supporting-frame A', said supporting-frame being made wider at its middle portion for the purpose of providing the necessary space for the trimming-knives. The trimming-knives are fed forward from time to time as they are worn away by sharpening, the thumb-screws $f$ serving for permitting the proper adjustment of the knives. At the sides of that pair of trimming-knives on the same side of the machine as the movable gripper-bar are arranged on the connecting-frame A' antifriction-rollers $f'$ $f^2$, which serve for the purpose of pressing the movable gripper-bar $d'$ tightly up against the fixed gripper-bar, so as to hold the stereotype-plate rigidly in position as the same is carried through between the trimming-knives.

*The plate removing, supporting, and depositing mechanism.*—When the carriage C arrives at the end of its motion, the outer end of the gripper-bar $d$ strikes against the spring-actuated stud $g$ of a U-shaped slide-frame G, which is guided in suitable keepers G' on the top of the connecting-frame A', each leg of said slide-frame being connected by pins $g'$ with two pivoted segments $G^2$, which are again connected by means of pins $g^\times$ with lifting-bolts $G^3$, which are guided in the keepers of the U-shaped slide-frame. The abutting of the gripper-bar $d$ against the spring-stud moves the slide-frame forward until the segments $G^2$ abut against the inner wall of the keeper, whereby the lifting-bolts are thrown forcibly outwardly from the keepers—i. e., inwardly toward the gripper-bars—which with the forward movement of the carriage have arrived opposite the lifting-bolts. The ends of the lifting-bolts pass under the stereotype-plate on the gripper-bars, and by reason of the fact that they are beveled lift it bodily, so that it just clears the gripper-bars and no longer rests thereon, but is supported by the bolts. When the carriage on returning arrives at its initial or starting position, a screw $g^2$ at its outer end abuts against a screw-nut $g^3$ at the outer side of the end of the slide-frame and produces thereby the inward motion of the slide-frame G, so that the lifting-bolts on which the trimmed stereotype-plate is supported are drawn back into the keepers and the plate dropped on the forward end of the carriage C.

*The delivery mechanism.*—At the next forward movement of the carriage the trimmed plate, which has been dropped on the forward end of the carriage, is moved along by the same until it arrives alongside of two gravity-fingers $i$, which are pivoted to angular supports $i'$, that are attached to the horizontal bracket-bar $A^2$ at the end of the supporting-frame A'. The fingers $i$ are shown in their normal vertical position in Fig. 20 and are located near the inner edge of the supporting-bracket $A^2$ and sidewise of the stereotype-plate as the same is fed forward. When the carriage C arrives at the end of its forward motion, an arm $m'$ at the lower part of the same abuts against the head of a screw $i^2$, that is arranged at the inner end of a horizontal arm $i^3$, which is attached to the lower end of a pendent U-shaped frame $i^4$, that is fulcrumed at its upper end to the angular support $i'$, as shown in Figs. 19 and 20. The pendent U-shaped frame $i^4$ is connected by a connecting-rod $i^5$ with a pendent bell-crank lever $i^6$, so that they are simultaneously oscillated by the contact of the arm $m'$ with the screw-stud $i^2$. The upper recessed ends of the U-shaped pendent frame $i^4$ and bell-crank lever $i^6$ engage the pin-shaped ends of intermediate fingers $i^7$, which are arranged between the upper parts of the pendent frame $i^4$ and bell-crank lever and the shifting fingers $i$ transversely to said shifting fingers and which rest normally on stop-pins $i^8$ on the transverse portion of the supports $i'$, as shown in Fig. 20. As soon as the U-shaped pendent frame $i^4$ and levers $i^6$ are oscillated the fingers $i^7$ are moved in upward direction away from their stop-pins $i^8$, and thereby the fingers $i$ moved in lateral direction into the position shown in dotted lines in Fig. 20. By the simultaneous lateral motion of the fingers $i$ they engage one side of the stereotype-plate and shift the same bodily in lateral direction over the edge of the conveyer-plate $A^3$, located at the outgoing end of the machine, so that the plate slides slowly over the conveyer and is delivered onto a table or into a suitable receptacle. The conveyer $A^3$ is supported on an inclined bracket-bar $A^4$, that is attached to the end of the opposite side of the supporting-frame A' from the fingers. As soon as the return motion of the carriage commences the arm $m'$ releases the pendent frame $i^4$ and lever $i^6$ and with the same the transverse fingers $i^7$, which are returned to their normal position by a helical spring $i^9$, which is connected with a pin $i^{10}$ at the lower end of the pendent frame $i^4$ and with a stationary pin $i^{11}$ on the angular support $i'$, the fingers $i$ returning by gravity to their original position, as shown in full lines in Fig. 19, ready for shifting the next stereotype-plate.

*The motion-reversing mechanism for the carriage.*—The carriage is provided with two arms $m\ m'$, which extend downwardly in the space between the two sides of the bed A' and which engage, respectively, near the end of their forward and backward motion with the carriage the shouldered ends of horizontal sliding rods $m^2$, which are guided in suitable keepers at the under side of the bed A' at one side of the same, as shown clearly in Fig. 3. The inner ends of said slide-rods $m^2$ are provided with slotted extensions $m^3$, arranged at right angles thereto, which engage pins $m^4$ of centrally-fulcrumed levers $m^5$, which extend parallel with each other at a suitable inclination to the longitudinal center line of the machine to the opposite side of the bed-frame A', their opposite ends being connected by a bent connecting-rod $m^6$. At the under side of the bed A' is guided a horizontally-sliding plate N, which carries a curved guide-groove N' of S shape. In this guide-groove is located an antifriction-roller $m^8$, which is carried at one end of a U-shaped belt-shifting frame M, which is guided in suitable keepers $m^7$, attached to the bed. The connecting-rod $m^6$ is pivoted centrally to the sliding plate N, said sliding plate being provided with a suitable bracket for this purpose, as shown in Fig. 7. The opposite end of the belt-shifting frame M extends parallel with the driving-shaft S and is provided near the fast and loose pulleys on the same with two belt-shifting forks $n$ $n'$, one extending upwardly and the other in downward direction, so that the straight and cross belts used for transmitting motion to the machine can be shifted on the pulleys, according as forward or backward motion is to be imparted to the carriage. The outer bent end of the frame M is provided with a guide-sleeve $m^9$, which is located on the outer end of the driving-shaft and serves to steady the frame M in its lateral motion.

Operation: Much of the operation of my improved machine will be apparent from the foregoing description. It may be summed up as follows: The plates to be trimmed are placed in the guide-box H H'. Let it be assumed that the carriage is at the end of its forward stroke. Upon its return the rear ends of the gripper-bars strike the shank $b^9$ of the lower set $b'$ of fingers of the standard H. Said fingers are thereby moved from the position shown in Fig. 13 to that shown in Fig. 14, and by means of the intermediate mechanism described the upper sets of fingers of each standard are thrown inwardly and the lower sets withdrawn, the upper sets passing into the pile of plates above the lowermost plate before the lower sets have passed out from under the same, so that the lowermost plate in the feed-box is dropped upon the open gripper-bars with its rib $p$ located in the space between the said bars and the remaining plates are supported on the upper sets of fingers. The return of the carriage causes also the actuation of the reversing— i. e., belt-shifting—mechanism. As the carriage approaches the end of its backward stroke the arm $m$ engages the shouldered end of the slide-rod $m^2$, thereby moving the plate N into the position shown in Fig. 3 and causing the shifting of the belts, so that the belt running formerly on the tight pulley L' is shifted to the loose pulley $L^2$ and the crossed belt, running in opposite direction, is shifted from the loose pulley L to the tight pulley L', thus reversing the direction of motion of the driving-shaft and all the parts geared thereto. The construction is such, however, that this reversal does not take place until the gear-wheel $e^8$ has been turned somewhat farther than shown in Fig. 2—i. e., so that the finger $e^7$ passes, by the yielding of the tip $e^5$ of the lever $e^4$, just above the same. On this return of the carriage also the lifting-bolts $G^3$ are thrown back into their keepers, as hereinbefore described. At the same time the gripper-bars open by reason of the interposed springs $d^4$. The movable gripper-bar passes out of contact with the pressure-roller $f'$ and is guided on a pin $x$, which limits its lateral movement at one end. At its opposite end the outward movement of the bar is limited by the standard H'. As the roller $f'$ is located nearer than the inner edge of the standard H' to the guide-groove of the supporting-bed, as shown in Fig. 6, the bars thus open sufficiently to allow the rib of a plate to enter between them. The carriage now commences its forward movement. The movable gripper is carried forward and rides up on the roller $f'$, and is thereby forced laterally toward the fixed gripper-bar, thus clamping the rib of the plate which rests upon the bars. By the mechanism before described the straightening-bar E is quickly moved in an arc and strikes upon the face of the plate, falling from the feed-box immediately after said plate reaches the gripper-bars and before it is entirely settled on the same. By reason of the fact that the arms of the straightening-bar are pivoted below the gripper-bars and at that side of the same opposite to the stationary gripper-bar it will be seen that the effect of this bar on the plate is to throw it laterally toward the stationary gripper-bar and cause the rib of the plate to contact with said bar, the latter serving in this manner as a guide or gage, so that thereby the reliable straightening of the plate and of all the plates fed to the machine in a uniform manner longitudinally in the machine is secured. Not only does the straightening-bar serve for straightening the plate laterally, but also for quickly settling the plate on the gripper-bars. This is necessary, as in case the plate should not fall at each end or side evenly or should rebound there is danger of its being caught in partly-raised position or tilted longitudinally by the closing grippers. The straightening-bar overcomes this and straightens the plate completely on the gripper-bars before it is clamped by the same. The spring $e^3$ returns the straightening-bar at once to its original position and the further turning of the wheel $e^8$ continues. Said wheel does not on the forward stroke of the carriage make a full rotation after the finger $e^7$ passes the lever $e^4$, as if it did so it would again operate the straightening-bar, which would be unnecessary; but the sizes of said wheel and the pinion $e^9$ are so proportioned that the direction of motion of the wheel $e^8$ is reversed with the reversing of the direction of motion of the carriage at the end of its stroke before the finger $e^7$ again reaches the lever $e^4$. Upon the forward movement of the carriage the spring $b^5$, acting upon the mechanism connecting the several sets of fingers $b$ $b'$, serves to return the same immediately to the position shown in Fig. 13, thus causing the entire superposed pile of plates in the feed-box H H' to descend and be again supported on the lower sets of fingers. As the gripper-bars pass between the knives the plate which overhangs the recessed sides of the gripper-bars, as shown in Fig. 18, is trimmed at each side simultaneously by the trimming-knives, the pressure-rollers $f'$ $f^2$ serving to keep the movable gripper-bar tightly clamped upon the rib of the plate during the cutting, so that the plate is thereby firmly held, so as to be evenly and smoothly cut. When the carriage approaches the end of its forward movement, the arm $m'$ contacts with the slide-rod $m^2$ and moves the same, and thereby the belt-shifting mechanism, so that the opposite belt is shifted to the tight pulley L' and the belt formerly on the same is shifted to a loose pulley. Before the reversal of the motion of the carriage takes place, however, the carriage moves far enough forward so that the movable gripper-bar passes out of contact with the roller $f^2$ and opens against the pins $x'$ $x^2$, so that the plate is released and simply rests on the gripper-bars. The striking of the end of the gripper-bar $d$ upon the buffer $g$ serves to throw the lifting-bolts $G^3$ outwardly, as before described, and the plate is thereby lifted and supported. The carriage then returns and receives another plate. On the return the screw $g^3$ abuts against the buffer $g^2$ and causes thereby the withdrawal of the lifting-bolts $G^3$ and the dropping of the trimmed plate upon the forward end of the carriage in the position shown in Fig. 20. The motion of the carriage is again reversed and the second plate is carried forward and trimmed, while the first plate is carried on the forward end of the carriage beneath the end of the U-shaped slide-frame G, which is upwardly bent for this purpose, as shown in Figs. 1, 2, and 21. At the end of the forward motion of the carriage the arm $m'$ strikes the screw-stud $i^2$ of the delivery mechanism and actuates the shifting-fingers, causing thereby the delivery of the trimmed plate onto the gravity-conveyer $A^3$ in the manner before described with reference to this mechanism. Simultaneously the second plate is lifted from the gripper-bars and the carriage returns for a third plate. The second plate is dropped and the third and second plates then carried forward by the carriage, the former being trimmed during its forward movement and then lifted from the grippers as the second is discharged from the machine by the delivery-fingers and conveyer. In this manner the stereotype-plates are quickly and cleanly trimmed in a perfectly automatic and reliable manner without requiring the handling of the individual plates during the operation.

Having thus described my invention, what I claim as new, and desire to secure by Letters Patent, is—

1. The combination, with a supporting-bed having guideways, of a reciprocating carriage guided thereon, gripper-bars on said carriage, one of said gripper-bars being stationary and the other laterally movable, stationary gripper-closing rollers arranged on said supporting-bed, and stationary trimming-knives also arranged on said supporting-bed, substantially as set forth.

2. The combination, with a supporting-bed having guideways, of a reciprocating carriage guided thereon, gripper-bars on said carriage, one of said gripper-bars being stationary and the other laterally movable, feeding-standards located directly over the path of said gripper-bars, mechanism for dropping one stereotype-plate after another from said standards upon said gripper-bars, gripper-closing rollers and stationary trimming-knives arranged on said supporting-bed, substantially as set forth.

3. The combination, with a supporting-bed having guideways, of a reciprocating carriage guided thereon, gripper-bars on said carriage, a spring-actuated straightening-bar pivotally supported on said bed, and means for moving said bar over the gripper-bars at the beginning of the forward stroke of the carriage, substantially as set forth.

4. The combination, with a reciprocating carriage, of gripper-bars for clamping a stereotype-plate, stationary trimming-knives, one at each side of the path of the gripper-bars, means for removing the stereotype-plate from the gripper-bars after being trimmed, and means for depositing the stereotype-plate on the carriage on completing its return stroke, substantially as set forth.

5. The combination, with a supporting-bed having guideways, of a reciprocating carriage guided thereon, stationary trimming-knives arranged on said supporting-bed, lifting-bolts arranged on said supporting-bed at each side of the path of the carriage and having beveled ends, means for guiding said bolts, and means for moving said bolts toward and from each other respectively at the end of each forward and return motion of the carriage, substantially as set forth.

6. The combination, with a reciprocating carriage, of gripper-bars for clamping a stereotype-plate, stationary trimming-knives, one at each side of the path of the gripper-bars, means for removing said plate from the gripper-bars when the carriage arrives at the end of its forward stroke, means for depositing the stereotype-plate upon the carriage when the same arrives at the end of its return stroke, mechanism for shifting said plate in lateral direction, and means for guiding the same to a suitable receptacle, substantially as set forth.

7. The combination, with a supporting-bed having guideways, of a reciprocating carriage guided thereon, gripper-bars on said carriage, brackets extending from the forward end of said bed, a conveyer-plate supported on one of said brackets, pendent shifting-fingers supported on the opposite bracket, and means for actuating said fingers at the end of each forward stroke of the carriage, substantially as set forth.

8. The combination, with a reciprocating carriage, of gripper-bars for receiving and clamping a stereotype-plate, stationary trimming-knives, one at each side of the path of the gripper-bars, means for removing the trimmed plate clear of the gripper-bars, and means for depositing the plate on the end of the carriage on the return motion of the same, said removing and depositing mechanism being operated by the carriage at the end of its forward and at the end of its return motion, substantially as set forth.

9. In a machine for trimming stereotype-plates, the combination, with a supporting-bed having guideways, of a reciprocating carriage guided thereon, gripper-bars on said carriage, and a feeding mechanism for feeding stereotype-plates to said gripper-bars, said mechanism comprising upright guide-standards arranged on said supporting-bed, two sets of feeding-fingers arranged in each standard, said fingers having beveled inner ends, and means for actuating said fingers so that while one set is moved inward the other is moved outward, substantially as set forth.

10. In a machine for trimming stereotype-plates, the combination, with a reciprocating carriage, of a stationary gripper-bar on said carriage, a movable gripper-bar on said carriage having a longitudinal taper strip secured to the same, and means for closing said gripper-bars, substantially as set forth.

11. In a machine for trimming stereotype-plates, a reciprocating carriage provided with a stationary gripper-bar, a movable and spring-actuated gripper-bar guided on a longitudinal rib of the stationary gripper-bar, a taper strip arranged at the side of the spring-actuated gripper-bar, means for longitudinally adjusting said strip, and means for pressing said movable gripper-bar toward the stationary gripper-bar for clamping a stereotype-plate, substantially as set forth.

12. In a machine for trimming stereotype-plates, a gripping device for gripping and clamping a stereotype-plate, consisting of a stationary gripper-bar, a movable and spring-actuated gripper-bar alongside of the same, means for guiding said movable gripper-bar relatively to said stationary gripper-bar, and an adjustable taper strip in the outer edge of the movable gripper-bar, substantially as set forth.

13. In a machine for trimming stereotype-plates, the combination, with a reciprocating carriage, of gripper-bars supported on the same, guide-standards for the stereotype-plates, means for dropping one plate after another from said guide-standards on said gripper-bars, a straightening device arranged alongside of the gripper-bars, and means for oscillating the straightening device so as to place the stereotype-plate in proper position in the gripper-bars, substantially as set forth.

14. In a machine for trimming stereotype-plates, the combination, with a reciprocating carriage, of gripper-bars supported on the same, one of said gripper-bars being stationary and the other spring-cushioned and laterally movable, a straightening-bar arranged alongside of said gripper-bars, and means for moving said straightening-bar over the stereotype-plate as soon as the same is dropped on the gripper-bars, substantially as set forth.

15. In a machine for trimming stereotype-plates, the combination, with a supporting-bed having guideways, of a reciprocating carriage guided thereon, gripper-bars on said carriage, and a straightening device, consisting of lever-arms pivoted below the level of said gripper-bars, a straightening-bar at the outer ends of said lever-arms, and a tripping mechanism for oscillating said arms, substantially as set forth.

16. In a machine for trimming stereotype-plates, the combination, with a reciprocating carriage, of gripper-bars on the same for clamping the stereotype-plates, and a removing mechanism arranged at both sides of the end of the carriage, said mechanism consisting of laterally-reciprocating bolts having beveled inner edges, a U-shaped actuating-frame, means for connecting said U-shaped frame with said bolts, and spring-studs at the outer end of said actuating-frame, substantially as set forth.

17. In a machine for trimming stereotype-plates, the combination, with a supporting-bed having guideways, of a reciprocating carriage guided thereon, gripper-bars on said carriage, and a plate-removing mechanism, consisting of lifting-bolts having beveled inner ends and guided in keepers of the supporting-bed, a U-shaped frame, a pivoted segment connecting each bolt with said frame, and means for actuating said U-shaped frame, substantially as set forth.

18. In a machine for trimming stereotype-plates, the combination, with a reciprocating carriage, of gripper-bars arranged at one end of said carriage, stationary trimming-knives arranged at opposite sides of the path of said gripper-bars, means for removing the trimmed plate from the same, means for depositing it on the carriage when the same arrives at the end of its return stroke, mechanism for shifting the trimmed plate in lateral direction, means for actuating the shifting mechanism when the carriage arrives at the end of its forward stroke, and an inclined conveyer over which the plate is conducted to a suitable receptacle, substantially as set forth.

19. In a machine for trimming stereotype-plates, mechanism for shifting a trimmed plate, consisting of pendent and spring-actuated arms, pivot-rods connecting the lower ends of said arms, fulcrumed levers engaged by the upper ends of said arms and arranged at right angles thereto, stop-pins for said fulcrumed levers, and oscillating fingers actuated by said levers so as to produce the shifting of the plate in lateral direction, substantially as set forth.

20. In a machine for trimming stereotype-plates, the combination, with a supporting-bed having guideways, of a reciprocating carriage guided thereon, bracket-bars extending from one end of said supporting-bed, and a delivery mechanism, consisting of a conveyer-plate supported on one of said brackets, pendent shifting fingers supported on the opposite bracket, intermediate fingers movable against said pendent fingers, a spring-actuated frame connected with said intermediate fingers, and means for actuating said frame, substantially as set forth.

21. In a machine for trimming stereotype-plates, the combination, with a reciprocating carriage having gripper-bars at one end, and adapted at its opposite end to receive the plate after the same has been trimmed, of pendent fingers for shifting the trimmed plate laterally over the end of the carriage when the same arrives at the forward end of its motion, means engaging said carriage for actuating said laterally-shifting fingers, and an inclined conveyer-plate arranged opposite to said shifting device, substantially as set forth.

In testimony that I claim the foregoing as my invention I have signed my name in presence of two subscribing witnesses.

HERMANN WINTER.

Witnesses:
PAUL GOEPEL,
J. H. NILES.